US006298316B1

United States Patent
Diesel (12)

(10) Patent No.: US 6,298,316 B1
(45) Date of Patent: Oct. 2, 2001

(54) FAILURE DETECTION SYSTEM

(75) Inventor: John W. Diesel, Woodland Hills, CA (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/312,200

(22) Filed: May 14, 1999

Related U.S. Application Data (60) Provisional application No. 60/085,825, filed on May 18, 1998.

(51) Int. Cl.⁷ .......................................................... G06F 11/28
(52) U.S. Cl. ............................................... 702/190; 714/25
(58) Field of Search ................................ 702/190; 714/2, 714/25, 39, 40, 41, 47, 48, 49

(56) References Cited

U.S. PATENT DOCUMENTS

| 4,937,763 | * | 6/1990 | Mott | ..................... 702/183 |
| 5,105,372 | * | 4/1992 | Provost et al. | ...................... 702/185 |
| 5,760,737 | * | 6/1998 | Brenner | .................. 342/357 |
| 5,808,581 | * | 9/1998 | Braisted et al. | ..................... 342/357 |
| 6,233,530 | * | 5/2001 | Porter et al. | ........................... 702/77 |

OTHER PUBLICATIONS

Diesel & Luu, "GPS/IRS AIME: Calculation of Thresholds and Protection Radius Using Chi–Square Methods", Proceedings of ION GPS–95, Sep. 12–15, 1995, Session D6 Integrity, Palm Springs, California.

* cited by examiner

Primary Examiner—Marc S. Hoff
Assistant Examiner—Edward Raymond
(74) Attorney, Agent, or Firm—Robert E. Malm (57) ABSTRACT

The invention is a method and apparatus for determining a failure in a subsystem that is part of a system, the system being characterized in terms of a state vector comprising a plurality of state variables. The state vector is updated at times $(jK+k)T\Delta t$ using one or more Kalman filter processes, j taking on integer values, K being a predetermined integer, k taking on integer values between 1 and K for each value of j, T being a predetermined integer, and $\Delta t$ being a predetermined time interval. The method comprises the steps: (a) executing at present time a plurality of Kalman filter processes where one of the Kalman filter processes determines the state vector at present time minus $(K-1)T\Delta t$ using data from subsystems without failures; (b) determining the values of one or more statistical measures of one or more residuals for each of one or more Kalman filter processes for one or more time periods equal to or greater than $T\Delta t$; and (c) determining a subsystem failure from the one or more values of the statistical measures.

27 Claims, 3 Drawing Sheets

FAILURE DETECTION SYSTEM

CROSS-REFERENCE TO RELATED APPLICATIONS

This application claims the benefit of U.S. Provisional Application No. 60/085,825, filed May 18, 1998.

STATEMENT REGARDING FEDERALLY SPONSORED RESEARCH AND DEVELOPMENT (Not Applicable)

BACKGROUND OF THE INVENTION

This invention relates generally to navigation systems and apparatus and more particularly to integrated radio-inertial navigation systems and apparatus.

The National Aeronautical Association has described the Global Positioning System as "the most significant development for safe and efficient navigation and surveillance of air and spacecraft since the introduction of radio navigation 50 years ago." The Global Positioning System (GPS) consists of 24 globally-dispersed satellites with synchronized atomic clocks that transmit radio signals. Time, as measured by each satellite, is embedded in the transmitted radio signal of each satellite. The difference between the time embedded in a satellite's radio signal and a time measured at the point of reception of the radio signal by a clock synchronized to the satellite clocks is a measure of the range of the satellite from the point of reception. Since the clocks in the system cannot be maintained in perfect synchronism, the measure of range is referred to as "pseudorange" because it includes both a satellite clock error and the clock error at the point of reception.

Each satellite transmits, in addition to its clock time, its position in an earth-fixed coordinate system and its own clock error. A user, by measuring the pseudoranges to four satellites and correcting the pseudoranges for the satellite clock errors, can first of all determine his actual range to each satellite and his own clock error. The user can then determine his own position in the earth-fixed coordinate system, knowing his range to each of the four satellites and the position of each satellite in the earth-fixed coordinate system.

GPS by itself is unsatisfactory as a sole means of navigation for civil aviation users. GPS has been designed to have extensive self-test features built into the system. However, a slowly increasing range bias error could occur due to satellite clock faults or due to errors in the uploaded data introduced as a result of human errors at the GPS Operational Control System Facility. Since such failures could affect users over a wide area, the Federal Aviation Authority requires that, even for approval as a supplemental navigation system, the system have "integrity" which is defined by the Federal Radio Navigation Plan (U.S. Dept. of Defense, DOD-4650.4 and U.S. Dept. of Transportation, DOT-TSC-RSPA-87-3 1986, DOT-TSC-RSPA-88-4 1988) as the ability to provide timely warnings to users when the system should not be used for navigation. For sole means of navigation, the system must also have sufficient redundancy that it can continue to function despite failure of a single component. For the non-precision approach phase of flight, a timely warning is 10 seconds. The present GPS integrity-monitoring system in the Operation Control System may take hours. A GPS "integrity channel" has been proposed to provide the integrity-monitoring function.

Because of the high cost of the GPS integrity channel, "receiver autonomous integrity monitoring" (RAIM) has been proposed wherein a receiver makes use of redundant satellite information to check the integrity of the navigation solution. It is sufficient to simply detect a satellite failure in the case of supplemental navigation. However, to detect a satellite failure using RAIM requires that at least five satellites with sufficiently good geometry be available.

For a sole means of navigation, it is also necessary to isolate the failed satellite and to be able to navigate with the remaining satellites. This requires that at least six satellites with sufficiently good geometry be available. To meet the integrity limit of 0.3 n.m. required for a non-precision approach, the availability of the five satellites, as required for supplemental navigation, is only 95 to 99 percent, depending on assumptions. However, the availability of the six satellites required for sole means is only 60 or 70 percent, which is totally inadequate.

If an inertial reference system (IRS) is also available, an attempt could be made to coast through integrity outage periods when the five satellites required for integrity are not available. Such periods sometimes last more than 10 minutes. An IRS which has not been calibrated in flight by GPS has a velocity accuracy specification of eight knots, 2 dRMS. It would therefore not be capable of meeting the accuracy requirement during such integrity outage periods. Moreover, for sole means of navigation it might also be necessary to coast through periods when six satellites were unavailable, in case a failure of one of these were detected. Since such periods can last more than an hour, the accuracy requirement cannot be achieved with an IRS uncalibrated by GPS.

The problem with calibrating the IRS with GPS using a conventional Kalman filter is that a GPS failure can contaminate the integrated GPS/IRS solution before the failure is detected. If the GPS failure causes a pseudorange error drift of less than one meter/sec., it cannot be detected by tests of the Kalman filter residuals.

BRIEF SUMMARY OF INVENTION

The invention is a method and apparatus for determining a failure in a subsystem that is part of a system, the system being characterized in terms of a state vector comprising a plurality of state variables. The state vector is updated at times $(jK+k)T\Delta t$ using one or more Kalman filter processes, j taking on integer values, K being a predetermined integer, k taking on integer values between 1 and K for each value of j, T being a predetermined integer, and $\Delta t$ being a predetermined time interval. The method comprises the steps: (a) executing at present time a plurality of Kalman filter processes where one of the Kalman filter processes determines the state vector at present time minus $(K-1)T\Delta t$ using data from subsystems without failures; (b) determining the values of one or more statistical measures of one or more residuals for each of one or more Kalman filter processes for one or more time periods equal to or greater than $T\Delta t$; and (c) determining a subsystem failure from the one or more values of the statistical measures.

DESCRIPTION OF THE INVENTION

The purpose of the failure detection system is to identify the satellites whose clock drifts are within specification and to use only those satellites within specification in estimating the user's position.

Figure 1:
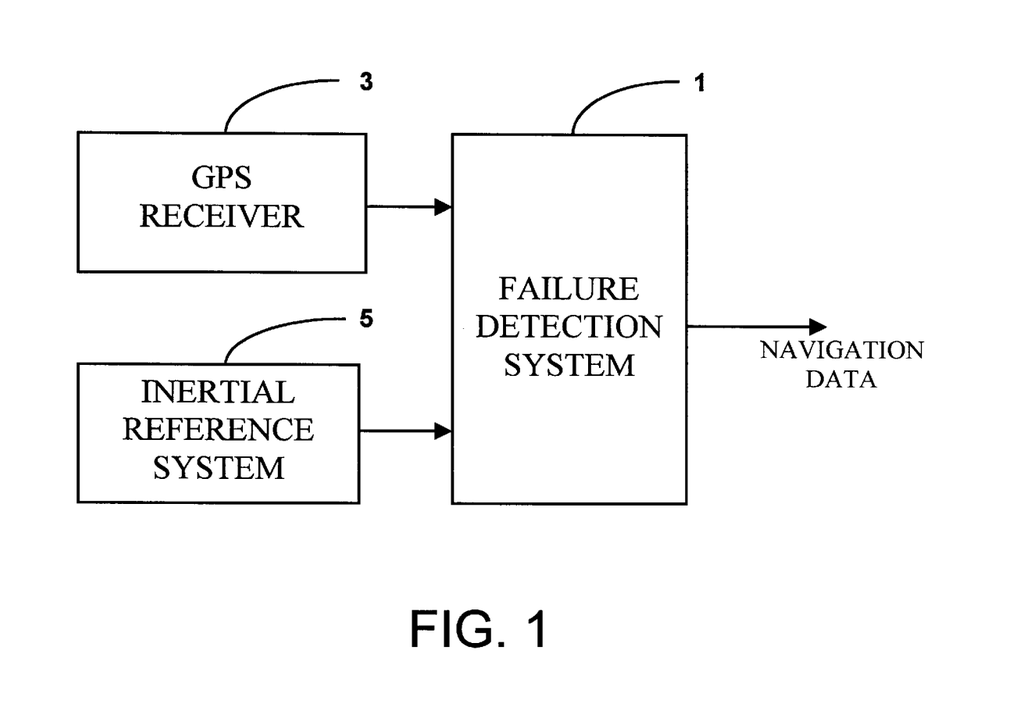
FIG. 1 shows a block diagram of the failure detection system, a global positioning system receiver, and an inertial navigation system.

As shown in FIG. 1, the failure detection system 1 operates in conjunction with a GPS receiver 3 and an inertial reference system 5 to produce navigation data for the platform on which it is installed by means of a Kalman filter process. The preferred embodiment of the failure detection system utilizes an Intel 80960 microprocessor and memory resources.

Figure 2:
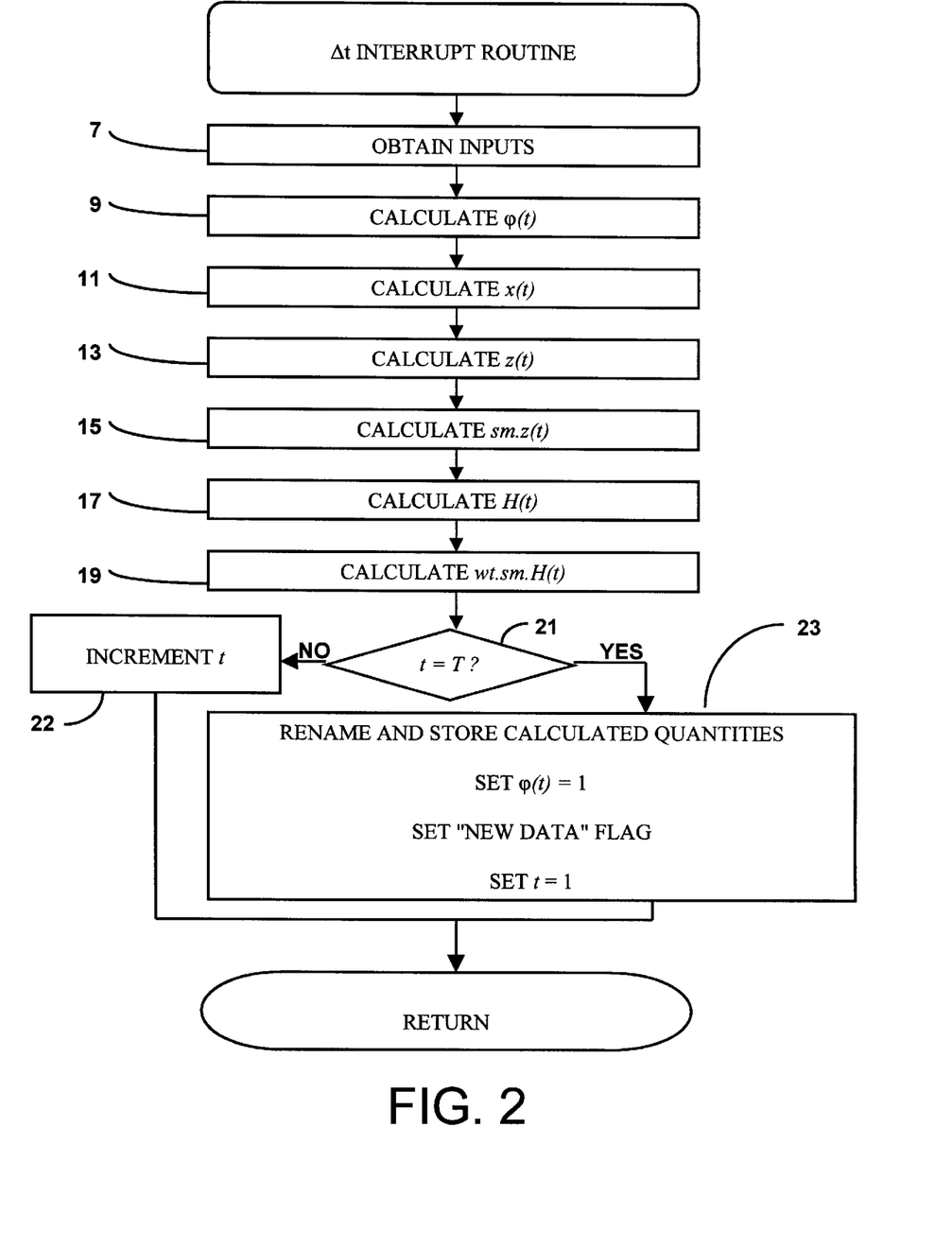
FIG. 2 shows the flow diagram for the interrupt routine which is performed each time new data is available to the failure detection system.

The interrupt routine shown in FIG. 2 details the operations regularly performed by the failure detection system at $\Delta t$ intervals where $\Delta t$ for the preferred embodiment is 1 second. In step 7, input data is obtained from the GPS receiver 3 and the inertial reference system 5.

The GPS receiver 3 supplies ARINC 743 quantities comprising the pseudorange $PR_i$ to each satellite i within view and the coordinates $X_{Si}$, $Y_{Si}$, and $Z_{Si}$ of each satellite in an earth-fixed/earth-centered coordinate system. The failure detection system is designed to accommodate up to N satellites at a time. Thus, the index i takes on values from 1 to N. The value of N for the preferred embodiment is 8.

The platform to which the failure detection system and the associated GPS and IRS equipments are mounted is a dynamic system which exists in a state that can be characterized by a state vector—a set of state variables that define in whole or in part the platform's position and orientation in space and the first and second derivatives with respect to time of its position. It is convenient in the present case to deal with the error-state vector which is the difference between the true state vector for the platform and the state vector as determined by the IRS.

The IRS supplies the following ARINC 704 quantities relating to the position, velocity, acceleration, and attitude of the IRS/GPS/failure detection system platform at intervals $\Delta t$.

$$\phi(t) = I + \sum_{n=1}^{t} F(n)\Delta t \qquad (1)$$

The transition matrix $\phi(t)$ is defined by the equation $$\phi(t) = I + \sum_{n=1}^{t} F(n)\Delta t \qquad (1)$$

where I (=Kronecker delta $\delta_{ij}$) is the unit matrix and the integer t measures time in increments of $\Delta t$. The integer takes on values from 1 to T, T being a design parameter. The value of T for the preferred embodiment is 150. The value of the increments in t in the preferred embodiment are one second increments. Although equation (1) is taken here as a definition of the transition matrix, it is sometimes necessary to add second order terms, which correspond more closely to the exact definition given in standard references on Kalman filters (e.g. A. Gelb, ed., *Applied Optimal Estimation*, The Analytical Sciences Corporation, The M.I.T. Press, Cambridge, Mass., 1974).

In step 9 of FIG. 2, the transition matrix $\phi(t)$ is obtained by adding $F(t)\Delta t$ to the prior value of $\phi(t)$, the prior value of $\phi(t)$ being the unit matrix when t equals 1.

The dynamics matrix $F=[F_{ij}]$ transforms the error-state vector into the time rate of change of the error-state vector, as shown by the equation $$\dot{x} = Fx \qquad (2)$$

For M=8 the dynamics matrix has 24 rows and 24 columns. The non-zero components of the dynamics matrix are defined as follows:

$F_{1,4} = -(1/R_y)$   $F_{2,3} = 1/R_x$   $F_{3,6} = -(A_z)$   $F_{3,7} = A_y$
$F_{3,11} = C_{xx}$   $F_{3,12} = C_{xy}$   $F_{4,5} = A_z$   $F_{4,7} = -(A_x)$
$F_{4,11} = C_{yx}$   $F_{4,12} = C_{yy}$   $F_{5,2} = -\omega_z$   $F_{5,4} = -(1/R_y)$
$F_{5,6} = \omega_x$   $F_{5,7} = -\omega_y$   $F_{5,8} = C_{xx}$   $F_{5,9} = C_{xy}$
$F_{5,10} = C_{xz}$   $F_{6,1} = \omega_z$   $F_{6,3} = 1/R_x$   $F_{6,5} = -\omega_z$
$F_{6,7} = \omega_x$   $F_{6,8} = C_{yx}$   $F_{6,9} = C_{yy}$   $F_{6,10} = C_{yz}$
$F_{7,1} = \omega_y$   $F_{7,2} = \omega_x$   $F_{7,5} = \omega_y$   $F_{7,6} = -\omega_x$
$F_{7,8} = C_{zx}$   $F_{7,9} = C_{zy}$   $F_{7,10} = C_{zz}$   $F_{8,8} = -(1/\tau_G)$
$F_{9,9} = -(1/\tau_G)$   $F_{10,10} = -(1/\tau_G)$   $F_{11,11} = -(1/\tau_A)$   $F_{12,12} = -(1/\tau_A)$
$F_{13,14} = 1$   $F_{14,14} = -(1/\tau_t)$   $F_{15,15} = -(1/\tau_{h0})$   $F_{16,16} = -(1/\tau_{h30K})$
$F_{17,17} = -(1/\tau_R)$   $F_{18,18} = -(1/\tau_R)$   $F_{19,19} = -(1/\tau_R)$   $F_{20,20} = -(1/\tau_R)$
$F_{21,21} = -(1/\tau_R)$   $F_{22,22} = -(1/\tau_R)$   $F_{23,23} = -(1/\tau_R)$   $F_{24,24} = -(1/\tau_R)$ The quantities $R_x$ and $R_y$ are the radii of curvature in the x and y directions respectively of the oblate spheroid that is used to model the earth. The values of these quantities are obtained from the equations $$\frac{1}{R_x} = \frac{\cos^2\alpha}{R_N} + \frac{\sin^2\alpha}{R_M} \qquad (3)$$

$$\frac{1}{R_y} = \frac{\cos^2\alpha}{R_M} + \frac{\sin^2\alpha}{R_N}$$

The radius of the earth along a meridian $R_M$ and the radius normal to a meridian $R_N$ are defined by equations (4) in terms of the equatorial radius a, the eccentricity e of the oblate spheroid that is used to model the earth, the wander-azimuth angle $\alpha$, and the latitude $\phi$.

$$R_M = \frac{a(1-e^2)}{(1-e^2\sin^2\phi)^{3/2}} \qquad (4)$$

$$R_N = \frac{a}{(1-e^2\sin^2\phi)^{1/2}}$$

The wander-azimuth angle $\alpha$ is the angle of rotation of the y-axis counter-clockwise from North. The wander-azimuth angle is obtained from the equation $$\alpha(t) = \alpha_0 + \sum_{n=1}^{t} \frac{V_E(n)}{R_N}\tan\phi(n)\Delta t \qquad (5)$$

where $\alpha_0$ is equal to the IRS platform heading $\psi_H$ for the first summation and is equal to the $\alpha(T)$ of the previous summation for each subsequent summation.

The IRS platform acceleration components in the x-y-z coordinate system are given by the equations $A_x = A_T \sin(\alpha + \psi_T) + A_C \cos(\alpha + \psi_T)$ $A_y = A_T \cos(\alpha + \psi_T) - A_C \sin(\alpha + \psi_T)$ $$A_z = A_V + g \quad (6)$$

where g is the acceleration of gravity.

The angular velocity components in the x-y-z coordinate system are given by the equations $$\omega_x = \rho_x + \Omega_x$$

$$\omega_y = \rho_y + \Omega_y$$

$$\omega_z = \rho_z + \Omega_z \quad (7)$$

The components in the x-y-z coordinate system of the IRS platform angular velocity $\rho$ are given by the equations $$\rho_x = -\frac{V_y}{R_y} \quad (8)$$

$$\rho_y = \frac{V_x}{R_x}$$

$$\rho_z = 0$$

where $$V_x = V_E \cos \alpha + V_N \sin \alpha$$

$$V_y = V_E \sin \alpha + V_N \cos \alpha \quad (9)$$

The components in the x-y-z coordinate system of the earth angular velocity $\Omega_E$ are given by the equations $$\Omega_x = \Omega_E \cos \phi \sin \alpha$$

$$\Omega_y = \Omega_E \cos \phi \cos \alpha$$

$$\Omega_z = \Omega_E \sin \phi \quad (10)$$

The coordinate transformation matrix $C=[C_{ij}]$, where the indices i and j take on the values x, y, and z, transforms vector components referenced to a body-fixed coordinate system on the IRS platform to vector components referenced to the x-y-z coordinate system. For example, the transformation from body-fixed acceleration components $[A^B_{ij}]$ to x-y-z components $[A_{ij}]$ is accomplished in the following way.

$$\begin{bmatrix} A_x \\ A_y \\ A_z \end{bmatrix} = \begin{bmatrix} C_{xx} & C_{xy} & C_{xz} \\ C_{yx} & C_{yy} & C_{yz} \\ C_{zx} & C_{zy} & C_{zz} \end{bmatrix} \begin{bmatrix} A^B_x \\ A^B_y \\ A^B_z \end{bmatrix} \quad (11)$$

The direction cosines $C_{ij}$ in these equations are computed from the IRS ARINC 704 heading, pitch, and roll outputs.

The $\tau$'s are the correlation times for the correlated error states. The values are as follows: $\tau_G = 3600$ s, $\tau_A = 300$ s, $\tau_r = 600$ s, $\tau_h = 1200$ s, and $\tau_R = 3600$ s. The diagonal elements of the process noise covariance matrix Q are obtained from the correlation times and the steady-state (s.s.) values for the diagonal elements of the error-state covariance matrix P(s.s.) by means of the equation $$Q_{RR} = \frac{2 P_{RR}(s.s.)}{\tau_n} \quad (12)$$

The values for the initial error-state covariance matrix are as follows: $P_{GG}(0) = (0.01 \text{ degrees/hr})^2$, $P_{AA}(0) = (25 \, \mu g)^2$, $P_{rr}(0) = (0.1 \text{ m/s})^2$, $P_{hh}(0) = (100 \text{ m})^2$, and $P_{RR}(0) = (30 \text{ m})^2$. In the case of Kalman filters denoted below by indices between 1 and M, the value of $P_{RR}(0)$ for the satellite being tested is $(1000 \text{ m})^2$. The double subscripts are intended to identify the quantities and also to indicate that the quantities are the diagonal elements of the covariance matrix. The zero in parentheses indicates that the quantities are initial values. For satellite-related quantities, the elements are inserted when a satellite first comes into view. For IRS quantities, the elements are inserted at equipment startup.

The 24 components of the error-state vector $x(t) = [x_i]$ for the Kalman filter processing are defined as follows:

| | | | | |
|---|---|---|---|---|
| $x_1 = d\theta_x$ | $x_2 = d\theta_y$ | $x_3 = dV_x$ | $x_4 = dV_y$ | $x_5 = d\phi_x$ |
| $x_6 = d\phi_y$ | $x_7 = d\phi_z$ | $x_8 = dGB_x$ | $x_9 = dGB_y$ | $x_{10} = dGB_z$ |
| $x_{11} = dAB_x$ | $x_{12} = dAB_y$ | $x_{13} = dB$ | $x_{14} = dB_r$ | $x_{15} = dh_{B0}$ |
| $x_{16} = dh_{B30K}$ | $x_{17} = dRB_1$ | $x_{18} = dRB_2$ | $x_{19} = dRB_3$ | $x_{20} = dRB_4$ |
| $x_{21} = dRB_5$ | $x_{22} = dRB_6$ | $x_{23} = dRB_7$ | $x_{24} = dRB_8$ | |

The error-state terms are referenced to a local-level wander-azimuth coordinate system having its origin at the IRS. The error-state terms have the following meanings.

| Symbol | Definition |
|---|---|
| $d\theta_x$, $d\theta_y$ | horizontal angular position errors; |
| $dV_x$, $dV_y$ | horizontal velocity errors; |
| $d\phi_x$, $d\phi_y$, $d\phi_z$ | alignment errors; |
| $dGB_x$, $dGB_y$, $dGB_z$ | gyro bias errors; |
| $dAB_x$, $dAB_y$ | horizontal accelerometer bias errors; |
| $dB$ | GPS receiver clock bias error; |
| $dB_r$ | GPS receiver clock rate bias error; |
| $dh_{B0}$ | error in barometric altitude at sea level; |
| $dh_{B30K}$ | error in barometric altitude at 30K feet minus $dh_{B0}$; |
| $dRB_i$ | GPS range bias error for i'th satellite, i taking on the values from 1 through M. (This error is caused by satelite clock drift, atmospheric errors, or low-frequency "selective availability" errors "Selective availability" is the process by which the GPS managers deliberately introduce satellite timing and position errors into the satellite transmissions for the purpose of reducing the accuracy of position determination by civilian and unauthorized users of the system.) |

The error-state vector extrapolated to time t is defined by the equation $$x(t) = \phi(t) x(k=K) \quad (13)$$

where $x_{M+1}(k=K)$ is the present estimate of the error-state vector obtained during the previous execution of the main program.

In step 11 of FIG. 2 x(t) is obtained using equation (13).

The measurements vector z(t) is obtained from the components of x(t). New values of longitude, latitude, and altitude are first determined from the equations $$d\theta_N = d\theta_x \sin \alpha + d\theta_y \cos \alpha$$

$$d\theta_E = d\theta_x \cos \alpha - d\theta_y \sin \alpha \quad (14)$$

$$d\lambda = d\theta_N \cos \phi$$

$$d\phi = -d\theta_E \quad (15)$$

$$\lambda = \lambda_{ARINC704} + d\lambda \quad (16)$$

$$\phi = \phi_{ARINC704} + d\phi$$

$$h_B = h_{B\ ARINC704} + dh_B + \frac{h}{30K} dh_{B30K}$$

The quantities $\lambda_{ARINC704}$, $\phi_{ARINC704}$, and $h_{B\ ARINC704}$ in equation (16) denote the ARINC 704 values of $\lambda$, $\phi$, and $h_B$.

The updated values of $\lambda$, $\phi$, and $h_B$ from equation (16) are used to calculate updated values for the position coordinates $X_I$, $Y_I$, and $Z_I$ of the IRS in an earth-fixed/earth-centered coordinate system by means of the equations $$X_I = (R_N + h_B) \cos \phi \cos \lambda$$
$$Y_I = (R_N + h_B) \cos \phi \sin \lambda$$
$$Z_I = [R_N(1-e^2) + h_B] \sin \phi \qquad (17)$$

The ranges $R_{ci}$ to the satellites and the direction cosines of the vector connecting the IRS platform to each of the satellites in the earth-fixed/earth-centered coordinate system are calculated using equations (18) and (19). The index i denotes a particular satellite.

$$R_{ci} = \sqrt{(X_{Si} - X_I)^2 + (Y_{Si} - Y_I)^2 + (Z_{Si} - Z_I)^2} \qquad (18)$$

$$e_{xi}^E = \frac{(X_{Si} - X_I)}{R_{ci}} \qquad (19)$$

$$e_{yi}^E = \frac{(Y_{Si} - Y_I)}{R_{ci}}$$

$$e_{zi}^E = \frac{(Z_{Si} - Z_I)}{R_{ci}}$$

The direction cosines to local level reference axes are obtained using equation (20). The symbol "C" denotes "cosine" and the symbol "S" denotes "sine".

$$\begin{bmatrix} e_{xi} \\ e_{yi} \\ e_{zi} \end{bmatrix} = \begin{bmatrix} C\alpha & S\alpha & 0 \\ -S\alpha & C\alpha & 0 \\ 0 & 0 & 1 \end{bmatrix} \begin{bmatrix} 1 & 0 & 0 \\ 0 & C\phi & -S\phi \\ 0 & S\phi & C\phi \end{bmatrix} \begin{bmatrix} C\lambda & 0 & -S\lambda \\ 0 & 1 & 0 \\ S\lambda & 0 & C\lambda \end{bmatrix} \begin{bmatrix} 0 & 1 & 0 \\ 0 & 0 & 1 \\ 1 & 0 & 0 \end{bmatrix} \qquad (20)$$

$$\begin{bmatrix} e_{xi}^E \\ e_{yi}^E \\ e_{zi}^E \end{bmatrix}$$

The computed pseudorange to the i'th satellite $PR_{ic}$ is obtained using equation (21). The quantity B is the GPS receiver clock bias.

$$PR_{ic} = R_{ci} - B - dB - dRB_i \qquad (21)$$

Finally, the value of zi for each satellite is obtained using equation (22) and the pre-filtered measured pseudorange $PR_i^+$.

$$z_i = PR_{ic} - PR_i^+ \qquad (22)$$

Figure 3:
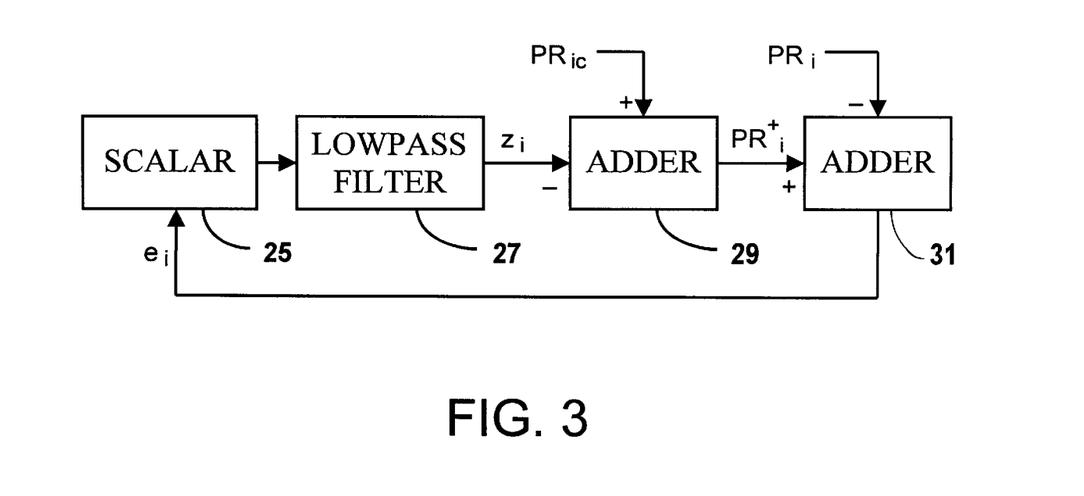
FIG. 3 shows a functional block diagram of a digitally-implemented processor for obtaining the difference between the smoothed measured psuedorange to a satellite and the computed pseudorange.

Equation (22) is solved with the digitally-implemented processor shown in block diagram form in FIG. 3. The function of the processor is to reduce the high-frequency noise due to "selective availability". "Selective availability" is the process by which the GPS managers deliberately introduce satellite timing and position errors into the satellite transmissions for the purpose of reducing the accuracy of position determination by civilian and unauthorized users of the system. The processor in FIG. 3 consists of the scaler 25, the lowpass filter 27, the adder 29, and the adder 31. The output of the adder 31 is the difference $e_i$ between the filtered pseudorange $PR_i^+$ and the pseudorange $PR_i$ supplied by the GPS receiver. This difference is substantially increased in amplitude by the scaler 25 and then filtered by the lowpass filter 27 having a time constant of about $T\Delta t$ thereby rapidly attenuating noise components with frequencies above about $1/T\Delta t$ Hz. The output $z_i$ of the lowpass filter 27 is subtracted from $PR_{ic}$ by adder 29 to give $PR_i^+$ in accordance with equation (22).

The sum of z(t) over all values of t, denoted by sm.z(t), is defined by the equation $$sm.z(t) = \sum_{n=1}^{t} z(n) \qquad (23)$$

the quantity sm.z(t) is obtained by adding z(t) to the prior value of sm.z(t).

The vector z(t) (=[$z_i(t)$]) is related to the error-state vector x(t) (=[$x_j$]) by the equation $$z(t) = H(t)x(t) + v(t) \qquad (24)$$

The matrix H (=[$H_{ij}$]) is called the observation matrix. The vector components $v_i(t)$ are measurement noise. The index i denotes an association with the i'th satellite and takes on the values from 1 to M.

The index j takes on the values from 1 to 24, the number of error-state components.

The values of $H_{ij}$ are zero except as follows: $H_{i,1} = -R_y e_{yi}$, $H_{i,2} = R_x e_{xi}$, $H_{i,13} = 1$, $H_{i,15} = e_{zi}$, $H_{i,16} = (h_B/30K) e_{zi}$, $H_{i,i+16} 1$. The values of $H_{ij}$ are calculated in step 17.

The weighted sum of H(t), denoted by wt.sm.H(t), is defined by the equation $$wt.sm.H(t) = \sum_{n=1}^{t} H(n)\phi(n) \qquad (25)$$

In step 19 of FIG. 2, wt.sm.H(t) is obtained by adding $H(t)\phi(t)$ to the prior value of wt.sm.H(t).

In step 21 the value of t is tested. If t is not equal to T, t is incremented in step 22 and a return to the main program is executed. If t is equal to T, the vectors x(t) and (1/T)sm.z(t) and the matrices $\Phi(t)$ and (1/T)wt.sm.H(t) are stored in memory in step 23 with the following names:

$$X(t = T) = x(k = K + 1) \qquad (26)$$

$$x(t = 0) = x_z(k = K)$$

$$\frac{1}{T} sm.z(t = T) = z(k = K)$$

$$\phi(t = T) = \phi(k = K)$$

$$\frac{1}{T} wt.sm.H(t = T) = H(k = K)$$

A "new data" flag is set and a return to the main program is then executed.

Previously stored data are assigned k-values ranging from 1 to K, the k=1 data being the oldest and the k=K data being the most recent. Newly-calculated data replaces the oldest data so that there are always K sets of data available in memory. The parameter K is equal to 12 in the preferred embodiment.

A range bias validity flag $VRB_i(k)$ is associated with each set of k-indexed data. If satellite i goes out of view, $VRB_i$ is set equal to 0. If satellite i is new in view, $VRB_i$ is set equal to 1.

The main program is comprised of M+3 Kalman filters—filters 1 through M for testing each of the M satellites, the (M+1)'th filter for updating present position, and the (M+2)'th filter for updating position 12 iterations in the past. The (M+3)'th filter is for testing failures of the inertial or barometric reference systems. Additional filters can be added to test additional failure modes.

A Kalman filter is a minimal mean-square-error method for estimating the error-state vector x(k) and its covariance matrix P(k) based on new measured data z(k), the previous estimates x(k−1) and P(k−1), the transition matrix φ(k), and the observation matrix H(k). Since the Kalman filter methodology is well understood in the art and details are readily available in a number of textbooks (e.g. A. Gelb, ed., *Applied Optimal Estimation*, The Analytical Sciences Corporation, The M.I.T. Press, Cambridge, Mass., 1974), details of the Kalman filter calculations will not be discussed herein.

Satellite data for a maximum of M satellites are saved in tables in the k-indexed portion of memory. As each satellite goes out of view, its entries in the table are zeroed, and the corresponding row and column of the covariance matrix for the range bias for that satellite are zeroed. The diagonal element is reinitialized with the initial variance of the range bias error.

When a new satellite comes into view, the data associated with the new satellite is placed in the first available empty position in the table. When a satellite represented in the table goes out of view, its data entries in the k-indexed memory are zeroed. The measurements for a newly-viewable satellite and its observation matrix are entered into the first available satellite slot at k=K.

The value of M is chosen such that the probability of more than M satellites being viewable at one time is low. However, if more than M satellites are viewable, those satellites that will remain in view for the longest periods of time are entered and allowed to remain in the tables.

Figure 4:
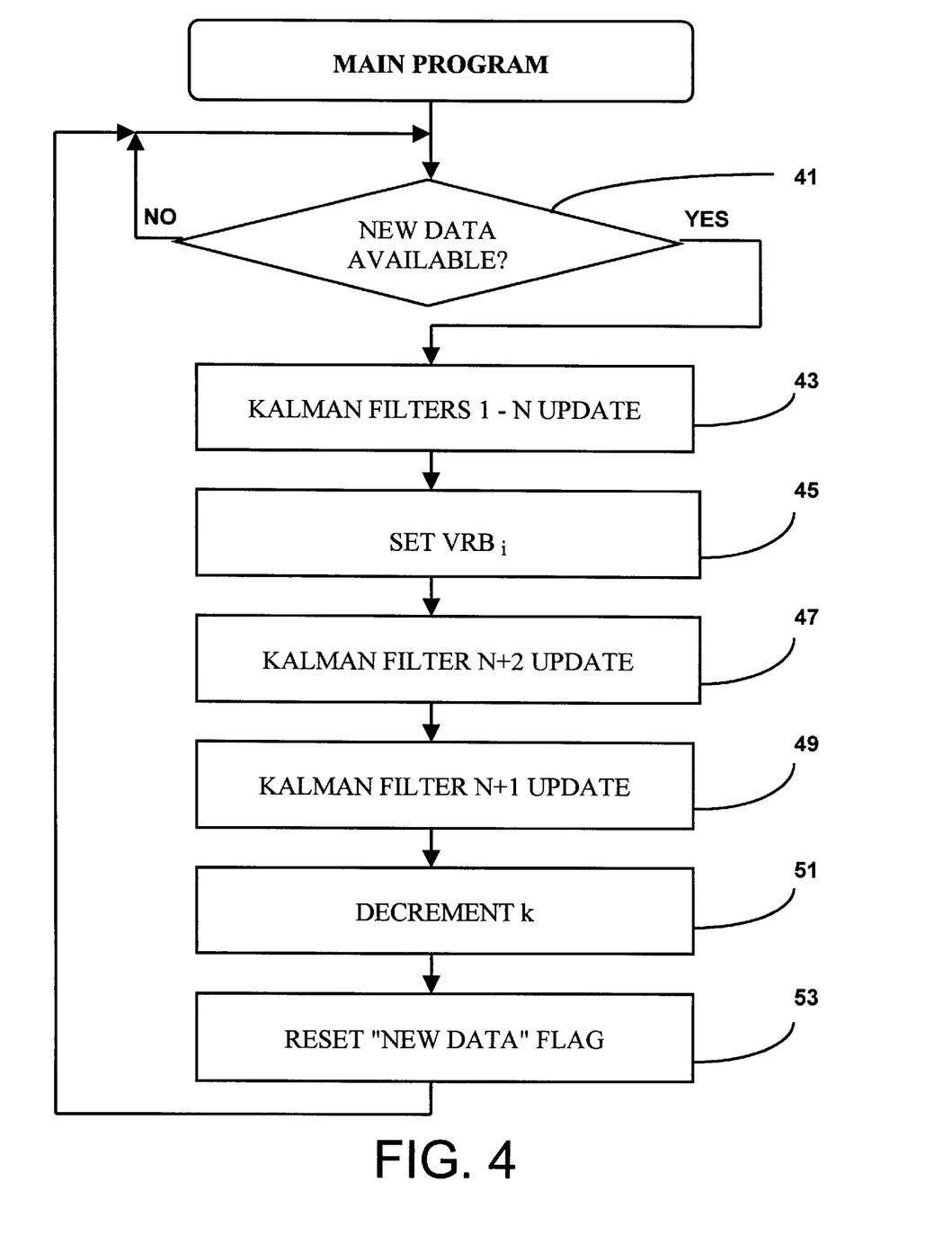
FIG. 4 shows the flow diagram for the main program of the failure detection system.

The flow diagram for the main program is shown in FIG. 4. In step 41, the microprocessor continually checks the status of the "new data" flag. When the flag indicates that new data is available in memory, the microprocessor proceeds to simultaneously test the validity of individual satellite data for all satellites represented in the satellite tables by means of M Kalman filters operating in parallel.

The i'th Kalman filter, which is used to test satellite i, has an extra error-state component $dRB_{ri}$ which is defined as the range bias rate error for satellite i. For M=8, this component becomes error-state component $x_{25}$. The additional non-zero dynamics matrix elements for this state are: $F_{16+i,25}=1$ and $F_{25,25}=-(1/\tau_{Rr})$. The value of the correlation time $\tau_{Rr}$ is 3600 s. The value of the diagonal element in the covariance matrix is: $P_{RrRr}(0)=(1\ m/s)^2$.

Each of the testing Kalman filters uses all of the measured satellite pseudorange data but is initialized with large variances for the range bias error and the range bias rate error for the satellite it is testing when that satellite first comes into view.

In step 43 the M Kalman filters update their calculations of the error-state vector and the covariance matrix utilizing the k=K data. The error-state vector used in calculating the measurement vector $z_i(k=K)$ was $x_z(k=K)=x_{(M+1)}(k=K)$ from the (M+1)'th Kalman filter. The error-state vector $x_j(k=K-)$ was obtained by the j'th Kalman filter as a result of the previous updating. A measurement vector $z_{ij}(k=K)$ consistent with $x_j(k=K-)$ is obtained from the equation $$z_{ij}(k=K)=z_i(k=K)+H[x_j(k=K-)-x_z(k=K)] \quad (27)$$

Using $x_j(k=K-)$ and $z_{ij}(k=K)$ the M testing Kalman filters update the error-state vector and the covariance matrix. The updated error-state vector and covariance matrix are stored in memory locations indexed by k=1 which will be reindexed later in the program to k=K prior to the next updating.

In step 45 the validity flags $VRB_i$ are set. The Kalman filter model for testing a satellite is based on the assumption that the particular satellite it is testing may be out of specification insofar as the satellite's clock drift is concerned. If for satellite i, the i'th Kalman filter estimated standard deviation of the range bias error is less than a specified maximum acceptable standard deviation for testing, and the estimated range bias error is less than a specified maximum acceptable value, the validity flag $VRB_i(k)$ is set equal to 2 for k=K.

If for satellite i, the Kalman filter estimated standard deviation of the range bias rate error is less than a specified maximum acceptable standard deviation for testing, and the range bias rate error estimate is less than a specified maximum acceptable value, the validity flag $VRB_i(k)$ is set equal to 3 for all values of k for which the satellite has been in view.

The test period is equal to KTΔt which for the preferred embodiment is equal to 30 minutes. The probability of two satellites unexpectedly failing during the same 30-minute interval is negligible. It is therefore reasonable to assume that all satellites other than satellite i are within specification when testing satellite i for failure. The test hypotheses are therefore:

$H_0(i)$: All satellites other than satellite i are within specification and satellite i is also within specification;

$H_1(i)$: All satellites other than satellite i are within specification and satellite i is out of specification.

When the failure hypothesis for all satellites in view has been tested, all satellites which have been determined to be within specification 30 minutes in the past with validity flag $VRB_i(k=1)=3$ are used by the (M+2)'th Kalman filter to determine the error-state vector $X_{M+2}(k=1+)$ and the associated covariance matrix in step 47. The Kalman filter utilizes error-state vector $x_{M+2}(k=1-)$, its associated covariance matrix, and the other data indexed at k=1. The error-state vector used in calculating the measurement vector $z_i(k=1)$ was $x_z(k=1)$ from the (M+1)'th Kalman filter with k=K at that time in the past. The error-state vector $x_{M+2}(k=1-)$ was obtained by the (M+2)'th Kalman filter as a result of the previous updating. A measurement vector $z_{ii}(k=1)$ consistent with $x_{M+2}(k=1-)$ is obtained from the equation $$z_{ii}(k=1)=z_i(k=1)+H[x_{M+2}(k=1-)-x_z(k=1)] \quad (28)$$

In step 49 all satellites which have been determined to be within specification with validity flag $VRB_i(k)>1$ are used by the (M+1)'th Kalman filter in the k'th iteration to determine the error-state vector $x_{M+1}(k=K+)$ and its associated covariance matrix. The (M+1)'th Kalman filter begins the updating process with the k=1 data. The Kalman filter utilizes error-state vector $X_{M+2}(k=1-)$, its associated covariance matrix, and the other data indexed at k=1 to obtain updated error-state vector $x_{M+1}(k=1+)$.

The error-state vector used in calculating the measurement vector $z_i(k=1)$ was $x_z(k)$ from the (M+1)'th Kalman filter with k=K at that time in the past. The error-state vector $x_{M+2}(k=1-)$ was obtained by the (M+2)'th Kalman filter as a result of the microprocessor's previous execution of the main program. The measurement vector $z_{ii}(k=1)$ is again defined by equation (27).

The (M+1)'th Kalman filter continues the updating process with the k=2 data. The Kalman filter utilizes error-state vector $x_{M+1}(k=2-)=\phi(k=1)x_{M+1}(k=1+)$, its associated covariance matrix, and the data indexed at k=2 to obtain updated error-state vector $x_{M+}(k=2+)$.

The error-state vector used in calculating the measurement vector $z_i(k=2)$ was $x_z(k=2)$ from the (M+1)'th Kalman filter with k=K at that time in the past. The error-state vector $X_{M+1}(k=1+)$ was obtained by the (M+1)'th Kalman filter as a result of the k=1 updating. A measurement vector $z_{ii}(k=2)$ consistent with $x_{M+1}(k=1+)$ is obtained from the equations $$x_{M+1}(k=2-)=\phi(k=1)x_{M+1}(k=1+)$$

$$z_{ii}(k=2)=z_i(k=2)+H[x_{M+1}(k=2-)-x_z(k=2)] \qquad (29)$$

The (M+1)'th Kalman filter continues the updating process in the same manner for k=3, k=4, ..., k=K. At each step, the residuals for each measurement are saved in memory. After k=K, the residuals for each satellite are averaged over the entire interval to detect a slow satellite clock drift.

In step 51 the k indices of the memory locations are decremented by 1 so that K becomes K-1, K-1 becomes K-2, ..., 2 becomes 1, and 1 becomes K. The measurements $z_i(k=K)$ and $x_z(k=K)$ will not be available until they are calculated in equation (26) as z(k=K) and x(k=K) in step 23 of FIG. 2. In step 53 the "new data" flag is reset. The updating process is now complete and the microprocessor returns to the beginning of the main program.

The preferred embodiment as described herein performs the measurements that establish the quality of the measurements supplied by the GPS for determining platform position. In particular, if a slow clock drift for a particular satellite is detected, that satellite's measurements are not used. The failure detection system could also perform its intended function if the quality measurements were supplied by an external source.

It was stated above that at each step, the residuals for each measurement are saved in memory, and after k=K, the residuals for each satellite are averaged over the entire interval to detect a slow satellite clock drift. A new approach to obtaining such an average is described below.

The residual vector r(k) is defined as $$r(k)=z(k)-H(k)\cdot x^-(k) \qquad (30)$$

where $x^-(k)$ is the error state estimate prior to measurement update. The covariance of the residual vector is defined by the equation $$V(k)=E[r(k)\cdot r^T(k)] \qquad (31)$$

where E[ ] stands for the expected value of the quantity in brackets.

The covariance of the averaged residual vector over the entire interval is calculated by first calculating its inverse:

$$V_{avg}^{-1} = \sum_k V^{-1}(k) \qquad (32)$$

where $$V(k)=H(k)\cdot P^-(k)\cdot H^T(k)+R(k)+R(k) \qquad (33)$$

$P^-(k)$ is the covariance matrix prior to measurement update, and R(k) is the measurment noise power spectral density.

The average of the residual vector is then obtained as $$r_{avg} = (V_{avg}^{-1})^{-1} \cdot \sum_k V^{-1}(k)\cdot r(k) \qquad (34)$$

The normalized sum-squared average residual is then computed:

$$s_{avg}^2 = r_{avg}^T \cdot V_{avg}^{-1} \cdot r_{avg} \qquad (35)$$

A threshold is set on the magnitude of $s_{avg}^2$, which is the statistic used to detect failures. If the threshold is exceeded, a failure is indicated.

To detect fast, medium, and slow failures, the residual is averaged over short, medium, and long intervals. In the preferred embodiment, with Kalman filter cycles of 150 seconds, the short, medium and long intervals are respectively 1 cycle (2.5 minutes), 4 cycles (10 minutes), and 12 cycles (30 minutes).

If a failure is detected by the (M+1)'th Kalman filter for estimating position, the single test filter from 1 through M which has the smallest corresponding normalized sum-squared average residual statistic is assumed to correspond to the bad satellite. This is true since it has a larger initial covariance and also a larger than normal process noise for the bad satellite so that its hypothesis of failure of the satellite will cause smaller normalized residuals. This principle is also applied to the (M+3)'th test filter for detecting IRS or barometric altitude failures. If the normalized sum-squared average residuals of this filter are smallest, the IRS or barometric altitude is identified as the source of the failure.

There may be an insufficient number of satellites in view at system turn-on to detect and identify failures using new satellite information alone. For this reason, if the position and altitude errors at the end of the previous flight are small, as indicated by the corresponding covariance matrix, the position and altitude are stored for the next flilght. This enables the Kalman filter to be initialized with small initial position errors to assist in detecting and identifying initial satellite errors. To determine that the aircraft has not been moved since the previous flight, the heading at the end of the previous flight is also stored, and compared with the heading determined during alignment after the present turn-on. A comparison heading change tolerance of one degree is used in the preferred embodiment.

When used for precision approach with differential GPS, as when using the wide area augmentation system (WAAS), it is desirable to store gravity anomalies and gravity deflections of the vertical along the final approach path to improve the accuracy of the IRS for detecting DGPS failures, and for improved coasting, in case the DGPS signal is lost due to intentional or unintentional interference. In this case, additional error-states for the estimated gravity errors are added to the lowpass filter labeled 27 in FIG. 3.

What is claimed is:

1. A method for determining a failure in a subsystem that is part of a system, the system being characterized in terms of a state vector comprising a plurality of state variables, the state vector being updated at times (jK+k)TΔt using one or more Kalman filter processes, j taking on integer values, K being a predetermined integer, k taking on integer values between 1 and K for each value of j, T being a predetermined integer, Δt being a predetermined time interval, the method comprising the steps:

(a) executing at present time a plurality of Kalman filter processes, one of the Kalman filter processes determining the state vector at present time minus $(K-1)T\Delta t$ using data from subsystems without failures;

(b) determining the values of one or more statistical measures of one or more residuals for each of one or more Kalman filter processes for one or more time periods equal to or greater than $T\Delta t$;

(c) determining a subsystem failure from the one or more values of the statistical measures.

2. The method of claim 1 wherein step (a) comprises the step:

(a1) executing an $(M+2)$'th Kalman filter process at present time to obtain the error-state vector and associated covariance matrix for present time minus $(K-1)T\Delta t$ utilizing data resulting from the prior execution of the $(M+2)$'th Kalman filter process, M being a predetermined integer, the $(M+2)$'th Kalman filter process utilizing data from only those subsystems without failures during the period from present time minus $KT\Delta t$ to present time minus $T\Delta t$.

3. The method of claim 2 wherein the measurement vector utilized by the $(M+2)$'th Kalman filter process is obtained by modifying a measurement vector utilized by an $(M+1)$'th Kalman filter process.

4. The method of claim 1 wherein step (a) comprises the step:

(a1) executing an $(M+1)$'th Kalman filter process at present time to obtain the error-state vector and associated covariance matrix for times equal to present time minus $(K-k)T\Delta t$ utilizing data resulting from the prior execution of the $(M+1)$'th Kalman filter process at present time minus $T\Delta t$, M being a predetermined integer, the $(M+1)$'th Kalman filter process utilizing data from subsystems available and operable during the period from present time minus $KT\Delta t$ to present time minus $T\Delta t$.

5. The method of claim 4 wherein the $(M+1)$'th Kalman filter process utilizes the error-state vector resulting from the execution of an $(M+2)$'th Kalman filter process and extrapolated to present time minus $(K-1)T\Delta t$ to obtain an updated error-state vector for present time minus $(K-1)T\Delta t$.

6. The method of claim 4 wherein the measurement vector utilized by the $(M+1)$'th Kalman filter process for present time minus $(K-k)T\Delta t$ is obtained by modifying the measurement vector utilized by the $(M+1)$'th Kalman filter process during a present time minus $T\Delta t$ execution for present time minus $(K-k)T\Delta t$.

7. The method of claim 1 wherein step (a) comprises the steps:

(a1) executing M Kalman filter processes for testing M subsystems comprising a system, the m'th Kalman filter process providing information concerning failures in the m'th subsystem, the number of subsystems in a system being equal to or greater than M, the error-state vector including one or more components associated with each subsystem, the error-state vector components associated with the m'th subsystem being called the m-components, the values of the diagonal elements of the process noise covariance matrix corresponding to the m-components being set to values sufficiently high as to make the effect of the values of the m-components on the values of the other error-state components negligible.

8. The method of claim 7 wherein the m'th Kalman filter process is executed at present time to obtain the error-state vector and associated covariance matrix for present time utilizing data resulting from the prior execution of the m'th Kalman filter process at present time minus $T\Delta t$, the M Kalman filter processes utilizing data from subsystems available and operable during the period from present time minus $KT\Delta t$ to present time minus $T\Delta t$.

9. The method of claim 7 wherein the measurement vector utilized by the m'th Kalman filter process is obtained by modifying the measurement vector utilized by an $(M+1)$'th Kalman filter process during a present time minus $T\Delta t$ execution for present time minus $T\Delta t$.

10. The method of claim 1 wherein at least one statistical measure is the average.

11. The method of claim 1 wherein step (c) comprises the steps:

(c1) determining that there are no subsystem failures; otherwise, (c2) determining the subsystem having a failure.

12. The method of claim 11 wherein an $(M+1)$'th Kalman filter process is executed at present time to obtain the error-state vector and associated covariance matrix for times equal to present time minus $(K-k)T\Delta t$ utilizing data resulting from the prior execution of the $(M+1)$'th Kalman filter process at present time minus $T\Delta t$, M being a predetermined integer, the $(M+1)$'th Kalman filter process utilizing data from subsystems available and operable during the period from present time minus $KT\Delta t$ to present time minus $T\Delta t$, the determination that there are no subsystem failures being made if the values of one or more statistical measures do not exceed respectively one or more predetermined threshold levels.

13. The method of claim 1 wherein M Kalman filter processes are executed for testing M subsystems comprising a system, the m'th Kalman filter process providing information concerning failures in the m'th subsystem, the number of subsystems in a system being equal to or greater than M, the error-state vector including one or more components associated with each subsystem, the error-state vector components associated with the m'th subsystem being called the m-components, the values of the diagonal elements of the process noise covariance matrix corresponding to the m-components being set to values sufficiently high as to make the effect of the values of the m-components on the values of the other error-state components negligible, the subsystem having a failure being associated with the Kalman filter process for which the values of one or more statistical measures respectively exceed one or more predetermined thresholds.

14. Apparatus for practicing the method of claim 1.

15. Apparatus for determining a failure in a subsystem that is part of a system, the system being characterized in terms of a state vector comprising a plurality of state variables, the state vector being updated at times $(jK+k)T\Delta t$ using one or more Kalman filter processes, j taking on integer values, K being a predetermined integer, k taking on integer values between 1 and K for each value of j, T being a predetermined integer, $\Delta t$ being a predetermined time interval, the method comprising the steps:

a first processor for executing at present time a plurality of Kalman filter processes, one of the Kalman filter processes determining the state vector at present time minus $(K-1)T\Delta t$ using data from subsystems without failures;

a second processor for determining the values of one or more statistical measures of one or more residuals for each of one or more Kalman filter processes for one or more time periods equal to or greater than $T\Delta t$;

a third processor for determining a subsystem failure from the one or more values of the statistical measures.

16. The apparatus of claim 15 wherein the first processor comprises:

a means for executing an (M+2)'th Kalman filter process at present time to obtain the error-state vector and associated covariance matrix for present time minus (K−1)T$\Delta$t utilizing data resulting from the prior execution of the (M+2)'th Kalman filter process, M being a predetermined integer, the (M+2)'th Kalman filter process utilizing data from only those subsystems without failures during the period from present time minus KT$\Delta$t to present time minus T$\Delta$t.

17. The apparatus of claim 16 wherein the measurement vector utilized by the (M+2)'th Kalman filter process is obtained by modifying a measurement vector utilized by an (M+1)'th Kalman filter process.

18. The apparatus of claim 15 wherein the first processor comprises:

a means for executing an (M+1)'th Kalman filter process at present time to obtain the error-state vector and associated covariance matrix for times equal to present time minus (K−k)T$\Delta$t utilizing data resulting from the prior execution of the (M+1)'th Kalman filter process at present time minus T$\Delta$t, M being a predetermined integer, the (M+1)'th Kalman filter process utilizing data from subsystems available and operable during the period from present time minus KT$\Delta$t to present time minus T$\Delta$t.

19. The apparatus of claim 18 wherein the (M+1)'th Kalman filter process utilizes the error-state vector resulting from the execution of an (M+2)'th filter process and extrapolated to present time minus (K−1)T$\Delta$t to obtain an updated error- state vector for present time minus (K−1)T$\Delta$t.

20. The apparatus of claim 18 wherein the measurement vector utilized by the (M+1)'th Kalman filter process for present time minus (K−k)T$\Delta$t is obtained by modifying the measurement vector utilized by the (M+1)'th Kalman filter process during a present time minus T$\Delta$t execution for present time minus (K−k)T$\Delta$t.

21. The apparatus of claim 15 wherein the first processor comprises:

a means for executing M Kalman filter processes for testing M subsystems comprising a system, the m'th Kalman filter process providing information concerning failures in the m'th subsystem, the number of subsystems in a system being equal to or greater than M, the error-state vector including one or more components associated with each subsystem, the error-state vector components associated with the m'th subsystem being called the m-components, the values of the diagonal elements of the process noise covariance matrix corresponding to the m-components being set to values sufficiently high as to make the effect of the values of the m-components on the values of the other error-state components negligible.

22. The apparatus of claim 21 wherein the m'th Kalman filter process is executed at present time to obtain the error-state vector and associated covariance matrix for present time utilizing data resulting from the prior execution of the m'th Kalman filter process at present time minus T$\Delta$t, the M Kalman filter processes utilizing data from subsystems available and operable during the period from present time minus KT$\Delta$t to present time minus T$\Delta$t.

23. The apparatus of claim 21 wherein the measurement vector utilized by the m'th Kalman filter process is obtained by modifying the measurement vector utilized by an (M+1)'th Kalman filter process during a present time minus T$\Delta$t execution for present time minus T$\Delta$t.

24. The apparatus of claim 15 wherein at least one statistical measure is the average.

25. The apparatus of claim 15 wherein step the third processor comprises:

a means for determining that there are no subsystem failures; otherwise, a means for determining the subsystem having a failure.

26. The apparatus of claim 25 wherein an (M+1)'th Kalman filter process is executed at present time to obtain the error-state vector and associated covariance matrix for times equal to present time minus (K−k)T$\Delta$t utilizing data resulting from the prior execution of the (M+1)'th Kalman filter process at present time minus T$\Delta$t, M being a predetermined integer, the (M+1)'th Kalman filter process utilizing data from subsystems available and operable during the period from present time minus KT$\Delta$t to present time minus T$\Delta$t, the determination that there are no subsystem failures being made if the values of one or more statistical measures do not exceed respectively one or more predetermined threshold levels.

27. The apparatus of claim 15 wherein M Kalman filter processes are executed for testing M subsystems comprising a system, the m'th Kalman filter process providing information concerning failures in the m'th subsystem, the number of subsystems in a system being equal to or greater than M, the error-state vector including one or more components associated with each subsystem, the error-state vector components associated with the m'th subsystem being called the m-components, the values of the diagonal elements of the process noise covariance matrix corresponding to the m-components being set to values sufficiently high as to make the effect of the values of the m-components on the values of the other error-state components negligible, the subsystem having a failure being associated with the Kalman filter process for which the values of one or more statistical measures respectively exceed one or more predetermined thresholds.

* * * * *